US006225402B1

(12) United States Patent
O'Callaghan et al.

(10) Patent No.: US 6,225,402 B1
(45) Date of Patent: May 1, 2001

(54) AQUEOUS BASED DISPERSIONS FOR POLYOLEFINIC SUBSTRATES

(75) Inventors: Kevin Jude O'Callaghan; Wayne Taylor Riddick, both of Algonquin; Michael Davis Coad, Oak Park; Martin Joseph Will, II, Aurora, all of IL (US)

(73) Assignee: McWhorter Technologies, Inc., Carpentersville, IL (US)

( * ) Notice: Subject to any disclaimer, the term of this patent is extended or adjusted under 35 U.S.C. 154(b) by 0 days.

(21) Appl. No.: 09/268,279

(22) Filed: Mar. 15, 1999

Related U.S. Application Data

(63) Continuation-in-part of application No. 09/161,145, filed on Sep. 25, 1998, and a continuation-in-part of application No. 09/160,843, filed on Sep. 25, 1998, now abandoned.

(51) Int. Cl.[7] ............................... C08J 3/05; C08J 27/24; C08J 51/06
(52) U.S. Cl. ..................... 524/834; 524/504; 524/535; 524/802; 528/492
(58) Field of Search ...................... 524/504, 535, 524/802, 834; 528/492

(56) References Cited

U.S. PATENT DOCUMENTS

| | | |
|---|---|---|
| 3,579,485 | 5/1971 | Folzenlogen et al. . |
| 3,886,103 | 5/1975 | Koizumi et al. ................... 260/22 |
| 3,892,884 | 7/1975 | Garratt et al. . |
| 3,904,575 | 9/1975 | Satokawa et al. .................. 260/32.8 |
| 3,907,741 | 9/1975 | Maker et al. . |
| 3,948,837 | 4/1976 | Schmitt et al. . |
| 4,055,530 | 10/1977 | Poppe et al. . |
| 4,070,421 | 1/1978 | Etter, Jr. . |
| 4,107,126 | 8/1978 | Burke, Jr. et al. .................. 260/38 |
| 4,115,328 | 9/1978 | Bozzi et al. . |
| 4,116,903 | 9/1978 | Lietz et al. ....................... 260/22 |
| 4,238,578 | 12/1980 | Rim et al. . |
| 4,255,308 | 3/1981 | Brasen . |
| 4,294,740 | 10/1981 | Mizuguchi et al. . |
| 4,303,697 | 12/1981 | Baseden . |
| 4,312,795 | 1/1982 | Taguchi et al. .................... 260/18 |
| 4,374,232 | 2/1983 | Davis . |
| 4,384,056 | 5/1983 | Schmidt et al. ................... 523/221 |
| 4,413,071 | 11/1983 | Wistuba . |
| 4,458,040 | 7/1984 | Suzuki et al. . |
| 4,460,732 | 7/1984 | Buscall et al. . |
| 4,473,601 | 9/1984 | Kanatsu et al. ................... 427/274 |
| 4,506,040 | 3/1985 | Raes et al. . |
| 4,535,126 | 8/1985 | Iida . |
| 4,544,578 | 10/1985 | Duane, Jr. . |
| 4,556,048 | 12/1985 | Maki et al. . |
| 4,564,657 | 1/1986 | Nishikubo et al. . |
| 4,579,888 | 4/1986 | Kodama et al. . |
| 4,591,609 | 5/1986 | Kubo et al. . |
| 4,619,854 | 10/1986 | Penttinen . |
| 4,645,568 | 2/1987 | Kurps et al. . |
| 4,661,549 | 4/1987 | Walker . |
| 4,714,728 | 12/1987 | Graham et al. . |
| 4,724,186 | 2/1988 | Kelch . |
| 4,725,454 | 2/1988 | Galli et al. . |
| 4,725,640 | 2/1988 | Cowles . |
| 4,745,151 | 5/1988 | Noll et al. . |
| 4,755,434 | 7/1988 | Fujii et al. . |
| 4,755,435 | 7/1988 | Fujii et al. . |
| 4,756,975 | 7/1988 | Fujii et al. . |
| 4,795,785 | 1/1989 | Ito et al. . |
| 4,806,581 | 2/1989 | Walker . |
| 4,857,565 | 8/1989 | Henning et al. . |
| 4,904,724 | 2/1990 | Auchter et al. . |
| 4,921,625 | 5/1990 | Gorman et al. . |
| 4,945,003 | 7/1990 | Poole et al. . |
| 4,952,623 | 8/1990 | Auchter et al. . |
| 4,954,573 | 9/1990 | Fry et al. . |
| 5,001,197 | 3/1991 | Hendewerk . |
| 5,035,944 | 7/1991 | Frazza et al. ..................... 428/312.4 |
| 5,041,494 | 8/1991 | Franke et al. . |
| 5,041,495 | 8/1991 | Schwerzel et al. . |
| 5,051,464 | 9/1991 | Johnson et al. . |
| 5,055,516 | 10/1991 | Fisch et al. . |
| 5,068,266 | 11/1991 | Kogima et al. . |
| 5,093,390 | 3/1992 | Shibato et al. ..................... 523/339 |
| 5,102,944 | 4/1992 | Ohmika et al. . |
| 5,102,946 | 4/1992 | Chen et al. . |
| 5,107,069 | 4/1992 | Wichelhaus et al. . |
| 5,124,373 | 6/1992 | Baumgaertel et al. . |
| 5,130,373 | 7/1992 | Ashihara et al. . |

(List continued on next page.)

FOREIGN PATENT DOCUMENTS

| | | |
|---|---|---|
| 963985 | 3/1975 | (CA) . |
| 1007388 | 3/1977 | (CA) . |
| 193126 | 9/1986 | (EP) . |
| 226387 | 6/1987 | (EP) . |
| 616258 | 9/1994 | (EP) . |
| 703285 | 3/1996 | (EP) . |
| 725111 | 8/1996 | (EP) . |
| 74500 | 5/1997 | (EP) . |
| 770641 | 5/1997 | (EP) . |
| 780448 | 6/1997 | (EP) . |
| 874031 | 10/1998 | (EP) . |
| WO 90/12656 | 11/1990 | (WO) . |
| WO 93/01244 | 1/1993 | (WO) . |
| WO 93/03085 | 2/1993 | (WO) . |
| WO 93/03104 | 2/1993 | (WO) . |

OTHER PUBLICATIONS

Padget, "Polymers for Water–Based Coatings—A Systematic Overview," J. of Coatings Technol., vol. 66, No. 839, pp. 89–105 (1994).

\* cited by examiner

*Primary Examiner*—Tae H. Yoon
(74) *Attorney, Agent, or Firm*—Fitch, Even, Tabin & Flannery

(57) ABSTRACT

The present invention is directed to stable aqueous dispersions of an acrylic modified chlorinated polyolefin and a process for their preparation. The aqueous dispersions of acrylic modified chlorinated polyolefin are effective for use as coatings on treated and untreated polyolefinic substrates.

29 Claims, No Drawings

U.S. PATENT DOCUMENTS

| | | |
|---|---|---|
| 5,140,074 | 8/1992 | DeNicol, Jr. et al. . |
| 5,141,814 | 8/1992 | Anderson et al. .................... 428/407 |
| 5,143,976 | 9/1992 | Ashihara et al. . |
| 5,164,456 | 11/1992 | Vestburg et al. . |
| 5,169,888 | 12/1992 | Sales . |
| 5,173,523 | 12/1992 | Auchter et al. . |
| 5,180,766 | 1/1993 | Hayama et al. . |
| 5,189,108 | 2/1993 | Imai et al. . |
| 5,198,485 | 3/1993 | King et al. . |
| 5,258,444 | 11/1993 | Zezinka et al. . |
| 5,266,105 | 11/1993 | Tsuneta et al. . |
| 5,270,119 | 12/1993 | Yanutola .............................. 428/507 |
| 5,288,520 | 2/1994 | Toyoshima et al. . |
| 5,288,780 | 2/1994 | Jarzombek . |
| 5,300,578 | 4/1994 | Vestberg et al. . |
| 5,306,743 | 4/1994 | Klesse et al. ......................... 523/201 |
| 5,319,019 | 6/1994 | Nothnagel . |
| 5,319,032 | 6/1994 | Martz et al. . |
| 5,326,808 | 7/1994 | Floyd et al. ......................... 524/457 |
| 5,336,712 | 8/1994 | Austgen, Jr. et al. ............... 524/530 |
| 5,338,803 | 8/1994 | Sun et al. . |
| 5,349,022 | 9/1994 | Ashihara et al. . |
| 5,356,988 | 10/1994 | Nothnagel . |
| 5,380,771 | 1/1995 | Nothnagel . |
| 5,395,877 | 3/1995 | Pucknat et al. . |
| 5,397,602 | 3/1995 | Martz et al. . |
| 5,422,392 | 6/1995 | Floyd et al. ......................... 524/457 |
| 5,424,362 | 6/1995 | Hwang et al. . |
| 5,425,926 | 6/1995 | Kunikiyo et al. . |
| 5,427,856 | 6/1995 | Laura et al. . |
| 5,449,707 | 9/1995 | Higashiura et al. ................. 523/501 |
| 5,461,104 | 10/1995 | Daniel et al. ........................ 524/505 |
| 5,480,714 | 1/1996 | Ito et al. . |
| 5,480,939 | 1/1996 | Jackson et al. . |
| 5,484,840 | 1/1996 | Binkley .............................. 524/501 |
| 5,489,648 | 2/1996 | Okimura et al. . |
| 5,491,191 | 2/1996 | Chen . |
| 5,492,963 | 2/1996 | Ozawa et al. . |
| 5,504,129 | 4/1996 | Dandreaux et al. . |
| 5,504,162 | 4/1996 | Friedrich et al. . |
| 5,508,029 | 4/1996 | Petchul et al. . |
| 5,514,752 | 5/1996 | Gutweiler et al. . |
| 5,516,826 | 5/1996 | Schilling . |
| 5,525,676 | 6/1996 | Kitayama et al. . |
| 5,530,045 | 6/1996 | Brena et al. . |
| 5,534,591 | 7/1996 | Ozawa et al. . |
| 5,534,598 | 7/1996 | Guo . |
| 5,539,057 | 7/1996 | Giroux . |
| 5,569,685 | 10/1996 | Schreiber et al. . |
| 5,574,113 | 11/1996 | Kroner et al. . |
| 5,580,933 | 12/1996 | Verge et al. . |
| 5,587,418 | 12/1996 | Sasaki et al. . |
| 5,591,806 | 1/1997 | Recchia et al. . |
| 5,593,807 | 1/1997 | Sacripante et al. ................... 430/137 |
| 5,599,532 | 2/1997 | Faryniarz et al. . |
| 5,612,397 | 3/1997 | Gebhard et al. ....................... 524/35 |
| 5,614,309 | 3/1997 | Chung et al. . |
| 5,620,747 | 4/1997 | Laura et al. . |
| 5,620,826 | 4/1997 | Tavernier et al. . |
| 5,626,915 | 5/1997 | Laura et al. . |
| 5,629,046 | 5/1997 | Laura et al. . |
| 5,637,409 | 6/1997 | Stevens et al. . |
| 5,648,193 | 7/1997 | Patel et al. ........................... 430/137 |
| 5,648,405 | 7/1997 | Ma et al. . |
| 5,686,518 | 11/1997 | Fontenot et al. . |
| 5,688,856 | 11/1997 | Austgen, Jr. et al. ............... 524/505 |
| 5,693,423 | 12/1997 | Laura et al. . |
| 5,696,185 | 12/1997 | Beckerle et al. . |
| 5,698,637 | 12/1997 | Aarila . |
| 5,705,560 | 1/1998 | Takarabe et al. . |
| 5,709,946 | 1/1998 | Jackson et al. . |
| 5,721,310 | 2/1998 | Sempio et al. . |
| 5,728,207 | 3/1998 | Arfaei et al. . |
| 5,731,368 | 3/1998 | Stanley et al. . |
| 5,736,601 | 4/1998 | Egraz et al. . |
| 5,753,739 | 5/1998 | Diener et al. . |
| 5,753,742 | 5/1998 | Bumanlag . |
| 5,756,561 | 5/1998 | Wang et al. ......................... 523/161 |
| 5,756,566 | 5/1998 | Laura . |
| 5,777,022 | 7/1998 | Bugajski et al. . |
| 5,777,071 | 7/1998 | Smith . |
| 5,783,303 | 7/1998 | Tsuei . |
| 5,804,615 | 9/1998 | Schreiber et al. . |
| 5,849,072 | 12/1998 | Sommer et al. ..................... 106/403 |
| 5,932,654 * | 8/1999 | Ogawa et al. ....................... 524/504 |

AQUEOUS BASED DISPERSIONS FOR POLYOLEFINIC SUBSTRATES

This application is a continuation-in-part application of U.S. Ser. No. 09/161,145, filed Sep. 25, 1998, and now abandoned U.S. Ser. No. 09/160,843, filed Sep. 25, 1998.

The present invention relates to stable aqueous polymer dispersions for use in coatings for untreated polyolefinic substrates. More particularly, aqueous dispersions of acrylic modified chlorinated polyolefin (CPO) polymer are prepared by forming a polymer salt in a hydrophilic organic solvent and removing the hydrophilic organic solvent from the blend of water and the hydrophilic organic solvent.

BACKGROUND OF THE INVENTION

The use of polyolefin resins such as polypropylene has become widespread due to their desirable physical properties and their relatively low price. Polyolefinic materials are used extensively in the automobile industry for the manufacture of various external and internal automobile parts, such as bumpers, side mirror supports, interior panels and door handles. It is often desirable to apply a coating to the polyolefin substrate to achieve, for example, a protective and/or decorative coating.

Coating untreated polyolefin substrates is generally difficult because of poor adhesion of coatings to these types of substrates. Polypropylene possesses a low surface tension and low polarity. Hence, it is difficult to ensure that an applied coating will adhere effectively to the surface of a polypropylene substrate.

Two ways to obtain adhesion to polyolefinic substrates are through modifications of the substrate or through the use of adhesion promoting materials. Substrate pretreatment usually involves oxidizing the surface by methods such as flame treatment, gas plasma, corona discharge, UV radiation or chemical means. These processes usually have treatment uniformity problems or may adversely affect the substrate by increasing surface roughness or by overheating. Chlorinated polyolefins have been used as adhesion promoters. They are thought to adhere to the substrate via dispersive forces. The chlorine enhances the solubility in various solvents as well as promoting adhesion of the primer to topcoats by polar interactions.

Environmental concern over the use of organic solvents has become increasingly important to the coating industry. This concern not only extends to preservation of the environment for its own sake, but extends to public safety as to both living and working conditions. Volatile organic emissions resulting from coating compositions which are applied and used by industry and by the consuming public are not only often unpleasant, but also contribute to photochemical smog. Governments have established regulations setting forth guidelines relating to volatile organic compounds (VOCs) which may be released to the atmosphere. The U.S. Environmental Protection Agency (EPA) established guidelines limiting the amount of VOCs released to the atmosphere, such guidelines being scheduled for adoption or having been adopted by various states of the United States. Guidelines relating to VOCs, such as those of the EPA, and environmental concerns are particularly pertinent to the paint and coating industry which uses organic solvents that are emitted into the atmosphere.

Water-borne chlorinated polyolefin compositions have been developed that are useful as primers for coating polypropylene substrates. These types of compositions usually require the formation of CPO emulsions. These emulsions typically include maleinated CPO, surfactant, amine, water, and in some cases cosolvent. EP 774500 describes a blend of one of these emulsions with an acrylic resin and a crosslinker capable of reacting with the acrylic resin for providing a waterborne coating system for untreated polypropylene. This system is a blend and contains significant amounts of surfactant.

U.S. Pat. No. 5,637,409 describes an aqueous coating composition comprising a blend of surfactant, CPO, monomers, solvent, amine, and water. This dispersion is mixed with initiator and then applied to substrate. The polymerization of the monomers then takes place. This technique is in effect a two component system which contains the undesirable odor and necessary precautions associated with monomer handling. This type of system makes the production of a homogeneous defect-free film difficult.

SUMMARY OF THE INVENTION

The present invention is directed to stable aqueous dispersions of an acrylic modified chlorinated polyolefin and a process for their preparation. The aqueous dispersions of acrylic modified chlorinated polyolefin are effective for use as coatings on treated and untreated polyolefinic substrates. The aqueous dispersions of the invention have less than about 10 weight percent organic solvent, at least about 10 weight percent solids, and a viscosity of less than about 10 poise at about ambient temperature. The aqueous dispersions of the invention are effective for providing a coating with an adhesion of at least 4B as determined by ASTM method D3359.

In an important aspect of the invention, a chlorinated polyolefin having a weight average molecular weight of at least about 1000 is modified by grafting with an acrylic. A preformed acrylic polymer may be grafted onto the chlorinated polyolefin or acrylic monomers may be grafted and polymerized onto the chlorinated polyolefin. In an important aspect of the invention, the acrylic grafted onto the chlorinated polyolefin, whether it is a preformed acrylic polymer grafted onto the chlorinated polyolefin or the result of the grafting and polymerization of acrylic monomers onto the chlorinated polyolefin, has a weight average molecular weight of at least about 2000. The acrylic provides the acrylic modified chlorinated polyolefin with ionizable groups effective for allowing the acrylic modified chlorinated polyolefin to form a stable aqueous dispersion.

In accordance with the dispersion process of the invention, an acrylic modified chlorinated polyolefin polymer is synthesized in a organic solvent. The organic solvent may be a hydrophilic organic solvent, a hydrophobic organic solvent, or a mixture of hydrophobic organic solvent and hydrophilic organic solvent. In an important aspect of the invention, the organic solvent is a hydrophilic organic solvent and the hydrophilic solvent has a solubility in water of at least about 5 weight percent, at processing temperatures, based on the weight of the solvent and water mixture. The polymer which is formed in the organic solvent has an acid value of at least about 10, and has a solubility of at least about 25 weight percent in the organic solvent at processing temperatures, based on the weight of the polymer and solvent.

After the polymer is fully dissolved in the organic solvent the polymer may be neutralized by adding a neutralizer, by adding the polymer to water that already contains neutralizer, or by adding the polymer to water and then adding neutralizer to the polymer/water mixture. Depending on the type of ionizable groups present in the polymer it may be important that the polymer is neutralized before it is blended with water so that water dispersible neutralized ionizable groups are generally evenly distributed throughout the polymer.

In an important aspect of the invention, an amount of neutralizer is added effective for providing a dispersion of the polymer upon removal of the organic solvent. The neutralizer may be any salt-forming base compatible with the ionizable functional polymer such as sodium hydroxide or an amine. In a very important aspect the neutralizer is an amine type which includes ammonia, triethanol amine, dimethyl ethanol amine, diethylamine (DEA), triethylamine (TEA), 2-amino-2-methyl-1-propanol, and mixtures thereof. Not all of the ionizable groups on the polymers need to be reacted with the base (or neutralized).

After the formation of the polymer salt solution in the organic solvent, and mixing that solution with water to form a water/organic solvent/polymer salt blend, the organic solvent and possibly a portion of the water are removed or stripped from the blend at a duration, temperature and pressure effective for providing an aqueous dispersion having a resin mean particle size of not greater than about 15 microns, in an important aspect not greater than about 10 microns, and in a very important aspect not greater than about 5 microns. Further, after removal of organic solvent and water, the aqueous dispersion has a polymer concentration of at least about 10 weight percent and an organic solvent concentration of less than about 10 weight percent.

In the final step of the process of the invention, the organic solvent is removed from the water/organic solvent/polymer salt blend. In a very important aspect of the invention, at 25° C. the resulting dispersion will have a viscosity of less than about 10 poise.

In another aspect of the invention, the temperature of the stripping operation is below the temperature at which substantial loss of neutralizer would otherwise occur. The mean particle size of the resin does not exceed more than about 15 microns, and in an important aspect of the invention, the dispersion has a typical mean particle size range of less than about 10 microns. Dispersions with particle sizes above about 15 microns do not have acceptable stability.

DETAILED DESCRIPTION OF THE INVENTION

Definitions

"Polymeric vehicle" means all polymeric and resinous components in the formulated coating, i.e., before film formation, including but not limited to the water dispersible salt of a polymer. The polymeric vehicle may include a cross-linking agent.

"Coating binder" means the polymeric part of the film of the coating after solvent has evaporated and after any potential crosslinking has occurred.

"Formulated coating" means the polymeric vehicle and solvents, pigments, catalysts and additives which may optionally be added to impart desirable application characteristics to the formulated coating and desirable properties such as opacity and color to the film.

The term "aqueous medium" as used herein means water and a mixture of water and hydrophilic organic solvent in which the content of water is at least 10% by weight. Examples of hydrophilic solvents include alkylalcohols such as isopropanol, methanol, ethanol, n-propanol, n-butanol, secondary butanol, tert-butanol and isobutanol, ether alcohols such as methyl cellosolve, ethyl cellosolve, propyl cellosolve, butyl cellosolve, methyl carbitol and ethyl carbitol, ether esters such as methyl cellosolve acetate and ethyl cellosolve acetate, dioxane, dimethylformamide, diacetone alcohol, methyl ethyl ketone, acetone, tetrahydrofurfuryl alcohol, and mixtures thereof.

"Ionizable group" refers to functional groups on the polymer that can dissociate to form ionic species. Examples of ionizable groups include —COOH, —$SO_3H$, —$PO_4H_2$, and mixtures thereof.

"Neutralizer" refers to compositions which can associate with ionizable groups on the polymer to effect water dispersibility. Examples of neutralizers useful in the present invention include amines, ammonia, and metal hydroxides including NaOH and KOH. In an important aspect of the invention, the neutralizers are amines and/or ammonia.

"Cross-linker" means a di- or polyfunctional substance whose functional groups are capable of forming covalent bonds with the main or base resin.

"Substantially free of an effective amount of cross-linker" means a composition with not more than about 0.1 weight percent cross-linker. Aqueous dispersions of the present invention can provide effective coatings for a polypropylene substrate even where they are substantially free of an effective amount of cross-linker.

As used herein, the reaction product of an amine or ammonia with a carboxyl group produces a "salt".

"Substantially solventless" means a polymeric vehicle or formulated coating composition having not more than about five weight percent organic solvent.

"Solvent" means an organic solvent.

"Organic solvent" means a liquid which includes but is not limited to carbon and hydrogen whereas said liquid has a boiling point in the range of not more than about 150° C. at about one atmosphere pressure.

"Hydrophilic solvent" means a solvent that has a solubility in water of at least about 5 weight percent. "Volatile organic compounds" (VOCs) are defined by the U.S. Environmental Protection Agency at 40 C.F.R. 51.000 of the Federal Regulations of the United States of America.

"Baked formulated coating composition" means a formulated coating composition that provides optimum film properties upon heating or baking above ambient temperature.

"Dispersion" in respect to a polymeric vehicle, formulated coating composition, or components thereof means that the composition must include a liquid and dispersed particles detectable by light scattering.

"Dissolved" in respect to a polymeric vehicle, formulated coating composition or components thereof means that the material which is dissolved does not exist in a liquid in particulate form where particles larger than single molecules are detectable by light scattering.

"Soluble" means a liquid or solid that can be partially or fully dissolved in a liquid. "Miscible" means liquids with mutual solubility. "Imbibe water" means a liquid is miscible with water.

"Acid number" or "acid value" means the number of milligrams of potassium hydroxide required for neutralization of or reaction with ionizable groups present in 1 g of material, such as resin.

"Thermoplastic polymeric vehicle" is a polymeric vehicle which does not require cross-linking for a coating binder to form a film.

"Thermosetting polymeric vehicle" is a polymeric vehicle which irreversibly cross-links for a coating binder to form a film.

"Substantially free of an effective amount of emulsifier" means a composition with not more than about 0.5 weight percent emulsifiers based on resin solids. Aqueous dispersions of the present invention are substantially free of an effective amount of emulsifier.

"Substantially free of an effective amount of surfactant" means a composition with not more than about 0.5 weight percent surfactant based on resin solids. Aqueous dispersions of the present invention are substantially free of an effective amount of a surfactant.

As used herein, the term "stable aqueous dispersion" refers to dispersions which include resins having a mean particle size of less than about 15 microns and do not irreversibly separate after about 2 weeks at 120° F.

"Processing temperatures" used in accordance with the process of the present invention will range from about ambient temperature up to about 100° C. or higher in cases where an azetropic boiling point exceeds 100° C.

The overall process of the invention can be generally depicted as set forth below.

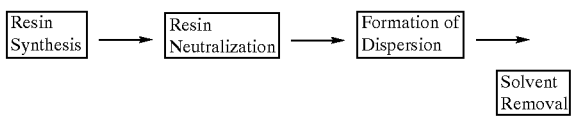

Resin Synthesis

In accordance with this stage of the present invention, acrylic modified chlorinated polyolefin is synthesized in organic solvent. The organic solvent may be a hydrophilic organic solvent, a hydrophobic organic solvent, or a mixture of hydrophilic and hydrophobic organic solvents. In an important aspect of the invention, the organic solvent is a hydrophillic solvent. Hydrophilic solvents useful in the present invention will have a solubility in water of at least about 5 weight percent at processing temperatures. In the aspect of the invention where the polymer is formed in a hydrophobic organic solvent or a mixture of hydrophobic and hydrophilic organic solvent, hydrophilic solvent may be added to the solution containing the polymer if necessary prior to subsequent neutralization.

In an important aspect of the invention, the chlorinated polyolefin polymer is modified by grafting with an acrylic. Chlorinated polyolefin polymers useful in the present invention have a chlorine content of from about 15 weight percent to about 35 weight percent (by weight of solid polymer), and a weight average molecular weight of about 1,000 to about 200,000, in an important aspect about 10,000 to about 100,000. In this aspect of the invention, examples of chlorinated polyolefin polymers include CP-343-1 (Eastman), CY-9122P (Hardlen), CP-164-1 (Eastman), and mixtures thereof.

The acrylic that is grafted onto the chlorinated polyolefin may be a preformed acrylic polymer. In this aspect of the invention, the preformed acrylic polymer has a weight average molecular weight of from about 2000 to about 2 million. Alternatively, acrylic monomers may be grafted and polymerized onto the chlorinated polyolefin. In this aspect of the invention, grafting of the acrylic monomers is effective for forming a grafted acrylic polymer with a weight average molecular weight of from about 2000 to about 2 million.

In an important aspect of the invention, the acrylic provides the acrylic modified chlorinated polyolefin with ionizable groups. In the aspect of the invention where —COOH is the ionizable group, the acid value is about 10 to about 250, preferably an acid value of about 40 to about 80. In an alternative aspect of the invention, where the ionizable group(s) includes -SO$_3$H, the acid value can be as low as about 5.

The acrylic resin used in this invention may be any acrylic resin which is effective for providing the acrylic modified chlorinated polyolefin with an acid value within the aforesaid range. The acrylic resin may be composed of a copolymer of an ethylenically unsaturated carboxylic acid or its anhydride which gives carboxyl groups of the aforesaid acid value to the resin and an acrylic or methacrylic ester and as desired, other ethylenically unsaturated monomers. Examples of the ethylenically unsaturated carboxylic acid or its anhydride include acrylic acid, methacrylic acid, crotonic acid, maleic acid, itaconic acid, citraconic acid, maleic anhydride, itaconic anhydride, and citraconic anhydride. Examples of ethylenically unsaturated monomers with ionizable groups other than —COOH include acrylamido (2-methyl propane sulfonic acid), vinyl phosphonic acid, and sodium styrene sulfate. Examples of the acrylic or methacrylic ester include methyl (meth)acrylate, ethyl (meth)acrylate, isopropyl (meth)acrylate, n-butyl (meth) acrylate, isobutyl (meth)acrylate, cyclohexyl (meth)acrylate, n-amyl (meth)acrylate, isoamyl (meth)acrylate, n-hexyl (meth)acrylate, 2-ethylhexyl (meth)acrylate, lauryl (meth) acrylate, and n-octyl (meth)acrylate. The (meth)acrylate represents an acrylate and a methacrylate. Examples of other ethylenically unsaturated monomers may include, for example, styrene, vinyltoluene, acrylonitrile, or methacrylonitrile, and vinyl ester monomers such as vinyl acetate, vinyl neononanoate, vinyl neodecanoate and vinyl neododecanoate. The resulting acrylic modified CPO will have a solubility in the hydrophilic solvent of at least about 25 weight percent at processing temperatures.

Resin Neutralization

In an important aspect of the invention, the polymer salt is formed in situ in the organic solvent with water being mixed with the polymer salt/organic solvent combination. In accordance with the invention, neutralizer is added to an organic solvent solution containing the resin in an amount effective for neutralizing the resin to provide sufficient salt to render the resin dispersible in water. Neutralizers useful in the present invention include but are not limited to ammonia, triethanol amine, dimethyl ethanol amine, diethylamine (DEA), triethylamine (TEA), 2-amino-2-methyl-1-propanol, and mixtures thereof.

The amount of neutralizer added is dependent on chemistry type, acid value and molecular weight. In one aspect, where the ionizable group is a carboxyl group, from about 30 to about 100 percent of the carboxyl groups are neutralized to obtain dispersions of the invention.

The polymer can be preneutralized by making the polymer with metal, amine or ammonia salts of the ionizable groups such as —COOH, —SO$_3$H, —PO$_4$H$_2$, and mixtures thereof. The polymer made from these "preneutralized" monomers would have an acid value, as measured by titration, of at least about 5 if the ionizable groups which form part of the polymer were not already neutralized.

Formation of Dispersion

In the next step of the process, water is added to the neutralized resin solution. The added water will generally have a temperature of between about 25° C. to about 65° C. In an important aspect of the invention, the initial ratio of solvent to water is about 3:1 to about 1:3, and in a very important aspect about 1:1.5. The amount of water to be added may be greater than that required to obtain the desired solids of the final dispersion. Some water loss typically occurs during solvent distillation. The system requires sufficient solvent at the beginning to solubilize the salt prior to water addition.

In an alternative aspect of the invention, polymer in hydrophilic solvent is added to water that already contains a neutralizer.

Solvent Removal

In the next step of the process, the organic solvent and water if required are removed or stripped from the neutralized resin/water/solvent mixture. A reduced atmospheric pressure may be applied to the mixture to aid in the removal of solvent and water, however, solvent may be stripped without the use of vacuum. In the aspect of the invention where vacuum is used, vacuum may range from about 10 inches to about 35 inches of mercury gauge. With lower temperatures, a higher vacuum must be used to remove solvent. In another aspect of the invention, solvent/water is stripped with heat being supplied through the use of a heat exchanger. Use of a heat exchanger may reduce distillation times and temperatures and further minimize destruction of the salt.

In an important aspect of the invention, solids levels of at least about 10 weight percent to about 50 weight percent can be attained for acrylic modified chlorinated polyolefins. In a very important aspect, the solids level of the dispersion is at least about 25 weight percent.

In another aspect of the invention, solvent that is removed can be purified and reused. A simple flash or multiple stage distillation is sufficient to clean the solvent of any contamination.

In an alternative aspect, the invention permits manufacture of the water dispersion from the polymer using one reaction vessel.

The aqueous dispersion of the invention does not require an effective amount of emulsifying agents or surfactants and does not have more than about 10 weight percent, based on the weight of the composition, of organic solvent after the distillation of the solvent. In an important aspect, the aqueous dispersion contains from about 0.2 to about 3 weight percent organic solvent, and in a very important aspect about 2 weight percent organic solvent. Further, the aqueous dispersions of the invention have a viscosity of less than 10 poise at ambient temperature, and in a very important aspect of the invention, have a viscosity of less than about 1 poise at ambient temperature.

The aqueous dispersion of the invention includes the water dispersible salt of the polymer as well as the unsalified polymer, but in the aspect of the invention where the ionizable group is a carboxyl group, the aqueous dispersion of the invention does not have less than 30 percent of the free carboxyl groups of the polymer neutralized or converted into a salt. As the acid value of the polymer is reduced, a higher percentage of the carboxyl groups on the polymer must be neutralized. Where the ionizable groups are —COOH, in order to maintain the dispersion below an acid value of about 15, about 100% of the carboxyl groups on the polymer should be neutralized to the salt. In an important aspect of the invention, about 100% of the carboxyl groups on the polymer are neutralized to the salt and the dispersions of the invention do not have more than about 2.5 pounds per gallon of dispersion (300 g/l) VOC, and in a very important aspect the dispersion has about 0.5 pounds per gallon of dispersion VOC. The water dispersion of the invention with about 0.5 pounds per gallon VOC is stable through at least about 1 freeze-thaw cycle, and up to about 4 freeze-thaw cycles. The number of freeze-thaw cycles passed can be increased by adding small amounts of solvents or glycols as is typically done in latex systems.

In an important aspect of the invention, a polymeric vehicle may be baked without an effective amount of cross-linker to provide a coating binder of a coating composition. In this aspect of the invention, as well as the aspect of the invention which provides a coating binder which is thermoset with a cross-linking agent above ambient temperatures, the polymeric vehicle which includes the aqueous dispersion of the invention provides a formulated coating composition having a VOC of less than about 2.8 pounds per gallon. The polymeric vehicle further includes water dispersible polymers and salts thereof having the above indicated molecular weights and not only eliminates a need for, but is substantially free of effective amounts of emulsifiers, surfactants and coalescents.

In another aspect of the invention, various crosslinkers may be used to improve the chemical properties of the paint system. The crosslinkers include but are not limited to aziridine, carbodiimide, isocyanate, melamine and mixtures thereof. Aziridine and carbodiimide can be used at levels of about 0.1 to about 10% based on the total resin solids of the system. Isocyanate can be used at about 0.1 to about 30% based on the total resin solids of the system. Melamine can be used at about 0 to about 50% based on the total resin solids of the system.

In an important aspect of the invention, the aqueous dispersions are effective for providing a coating with an adhesion to polyolefinic substrates of at least about 4B as determined by ASTM method D3359, and in an important aspect are effective for providing a coating with an adhesion of about 5B.

The following examples illustrate methods for carrying out the invention and should be understood to be illustrative of, but not limiting upon, the scope of the invention which is defined in the appended claims.

EXAMPLES

Example 1

Synthesis of Acrylic Modified CPO Resin

1. MEK solvent was weighed into a 2 liter round bottom flask equipped with condenser, nitrogen blanket, and an agitator and heated to 80° C.
2. 406 grams of CP 343-1 resin (Eastman Chemical) were added to the MEK under agitation and quickly dissolved.
3. 188 grams of cyclohexyl methacrylate (CHMA), 113 grams of methyl methacrylate (MMA), 179 grams of lauryl methacrylate (LMA) and 114 grams of methacrylic acid (MAA) were weighed and mixed together.
4. 10.0 grams of the initiator, t-butyl peroctoate, added to the monomer mixture listed above and the resultant mixture stirred and then added to a drop-funnel.
5. The monomer and initiator mix was then metered into the reaction flask over period of 3 hours using the drop-funnel.
6. At the end of the monomer addition, 2.5 grams of t-butyl peroctoate added to the reaction medium and the contents were left to react for a further 3 hours.
7. The resin solution was then cooled, and filtered. The solids content was 33.6%.

Example 2

Preparation of Acrylic Modified CPO Dispersion 1. 2425 grams of Example 1 were heated to 60° C. in a 12 liter round bottom flask equipped with stirrer, condenser and thermocouple.

2. 83.2 grams of 18.9% ammonium hydroxide solution were added to the flask and left to mix with resin for 15 minutes.
3. 2377 grams of water were then added to the flask over a period of 15 minutes. The mixture was then left to mix for 30 minutes.
4. A receiver system was added and using a water aspirator, vacuum was applied to the contents of the flask to effect the removal of MEK.
5. When the distillate was water, the vacuum distillation was discontinued and the mixture cooled and filtered.

Properties of acrylic modified CPO dispersion

| NVM: | 26.2% |
| Viscosity (RV#3 @ 100 RPM) | 35 cps |
| pH: | 7.85 |

Example 3

Formulation of a Coating Incorporating Acrylic Modified CPO Dispersions

1. The following components where premixed.

| | Amount in Grams |
| --- | --- |
| butyl cellosolve | 73.06 |
| Tamol 165A | 1.06 |
| Triton CF10 | 1.54 |
| Ammonia 28% | 6.62 |

2. The next four components where added slowly under agitation.

| | Amount in Grams |
| --- | --- |
| Quinaridone Violet | 14.99 |
| Carbon Black | 0.41 |
| Red Oxide | 16.69 |
| TiO$_2$ | 2.04 |

The blend was mixed well for 15 minutes and then ground for 1 hour at 5000 rpm with 40 grams of 1.5 mm glass media.

3. After grinding, the following components were added under agitation and mixed.

| | Amount in Grams |
| --- | --- |
| Water | 48.80 |
| Flattening Agent 1 | 11.90 |
| Flattening Agent 2 | 5.11 |

4. 600 grams of the dispersion from Example 2 was added to a separate container. The mixture set forth above was slowly added to the resin under agitation and the entire blend was mixed for 15 minutes.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for forming an aqueous dispersion of an acrylic modified chlorinated polyolefin, the method comprising:

forming an acrylic modified chlorinated polyolefin polymer in an organic solvent, the acrylic modified chlorinated polyolefin polymer having sufficient ionizable groups to provide the acrylic modified chlorinated polyolefin polymer with an acid value of at least about 10, the acrylic modified chlorinated polyolefin polymer being formed by joining an acrylic having ionizable groups with a chlorinated polyolefin to provide the acrylic modified chlorinated polyolefin which has an acrylic portion, the chlorinated polyolefin polymer having a chlorine content of about 15 to about 35 weight percent, based on the weight of solid chlorinated polyolefin polymer, and a weight average molecular weight of about 1,000 to about 200,000, the acrylic portion having a weight average molecular weight in the range of from about 2,000 to about 2,000,000, the acrylic modified chlorinated polyolefin polymer being at least about 25 weight percent soluble in the organic solvent at processing temperatures;

neutralizing the ionizable groups of the acrylic modified chlorinated polyolefin polymer with an amount of neutralizer effective to form a solution of neutralized polymer;

blending the solution of neutralized polymer with water to form a blend of neutralized polymer, organic solvent, and water; and removing the organic solvent from the blend at a temperature and pressure effective for forming a dispersion of the acrylic modified chlorinated polyolefin polymer having a particle size of not more than 15 microns, the dispersion having less than about 10 weight percent organic solvent, at least about 10 weight percent solids, and a viscosity of less than about 10 poise at ambient temperature, the dispersion effective for providing a coating having an adhesion to polyolefinic substrates of at least about 4B.

2. The method according to claim 1 wherein the acrylic is a pre-formed acrylic polymer.

3. The method according to claim 1 wherein acrylic monomers are grafted and polymerized onto the chlorinated polyolefin.

4. The method according to claim 1 wherein the ionizable group is selected from the group consisting of —COOH, —SO$_3$H, —PO$_4$H$_2$, and mixtures thereof.

5. The method according to claim 1 wherein the acrylic modified chlorinated polyolefin in the organic solvent is neutralized with a neutralizer selected from the group consisting of ammonia, triethanol amine, dimethyl ethanol amine, diethylamine, triethylamine, 2-amino-2-methyl-1-propanol, and mixtures thereof.

6. The method according to claim wherein water is added to the solution of the neutralized polymer in an amount effective to provide an initial ratio of solvent to water of about 3:1 to about 1:3.

7. The method according to claim 1 wherein the organic solvent is a hydrophilic organic solvent having a solubility in water of at least about 5 weight percent at processing temperatures.

8. The method according to claim 1 wherein the acrylic includes acrylic monomers to form the acrylic portion.

9. The method according to claim 1 wherein the acrylic is a preformed acrylic polymer which includes acrylic monomer and ethylenically unsaturated monomers which are not acrylic monomers.

10. A method for forming an aqueous dispersion of an acrylic modified chlorinated polyolefin, the method comprising:

grafting an acrylic onto a chlorinated polyolefin in an organic solvent to form an acrylic modified chlorinated polyolefin polymer with at least one acrylic graft, the acrylic graft having sufficient ionizable groups to provide the acrylic modified chlorinated polyolefin polymer with an acid value of at least about 10, the chlorinated polyolefin polymer having a chlorine content of about 15 to about 35 weight percent, based on the weight of solid chlorinated polyolefin polymer, and a weight average molecular weight of about 1,000 to about 200,000, the acrylic graft having a weight average molecular weight in the range of from about 2,000 to about 2,000,000, the acrylic modified chlorinated polyolefin polymer being soluble in the organic solvent at processing temperatures;

neutralizing the ionizable groups of the acrylic modified chlorinated polyolefin polymer with an amount of neutralizer effective to form a solution of neutralized polymer;

blending the solution of neutralized polymer with water to form a blend of neutralized polymer, organic solvent, and water; and removing the organic solvent from the blend at a temperature and pressure effective for forming a dispersion of the acrylic modified chlorinated polyolefin polymer having a particle size of not more than 15 microns, the dispersion having less than about 10 weight percent organic solvent, at least about 10 weight percent solids, and a viscosity of less than about 10 poise at ambient temperature, the dispersion effective for providing a coating having an adhesion to polyolefinic substrates of at least about 4B.

11. The method according to claim 10 wherein the acrylic modified chlorinated polyolefin polymer is at least about 25 weight percent soluble in the organic solvent at processing temperatures.

12. The method according to claim 11 wherein the acrylic is a preformed acrylic polymer.

13. The method according to claim 11 wherein acrylic monomers are grafted and polymerized onto the chlorinated polyolefin.

14. The method according to claim 11 wherein the ionizable group is selected from the group consisting of —COOH, —SO$_3$H, —PO$_4$H$_2$, and mixtures thereof.

15. The method according to claim 11 wherein the acrylic modified chlorinated polyolefin in the organic solvent is neutralized with a neutralizer selected from the group consisting of ammonia, triethanol amine, dimethyl ethanol amine, diethylamine, triethylamine, 2-amino-2-methyl-1-propanol, and mixtures thereof.

16. The method according to claim 11 wherein water is added to the solution of the neutralized polymer in an amount effective to provide an initial ratio of solvent to water of about 3:1 to about 1:3.

17. The method according to claim 11 wherein the dispersion has from about 0.2 to about 3 weight percent organic solvent.

18. The method according to claim 11 wherein the acrylic graft is a preformed acrylic polymer which includes acrylic monomer and ethylenically unsaturated monomers which are not acrylic monomers.

19. The method according to claims 11 or 17 wherein the ionizable group is selected from the group consisting of —COOH, —SO$_3$H, —PO$_4$H$_2$, and mixtures thereof.

20. The method according to claim 19 wherein the ionizable group comprises —COOH.

21. A method for forming an aqueous dispersion of an acrylic modified chlorinated polyolefin, the method comprising:

grafting an acrylic onto a chlorinated polyolefin in an organic solvent to form an acrylic modified chlorinated polyolefin polymer with at least one acrylic graft, the acrylic graft having sufficient ionizable groups to provide the acrylic modified chlorinated polyolefin polymer with an acid value of at least about 10, the chlorinated polyolefin polymer having a chlorine content of about 15 to about 35 weight percent, based on the weight of solid chlorinated polyolefin polymer, and a weight average molecular weight of about 1,000 to about 200,000, the acrylic graft having a weight average molecular weight in the range of from about 2,000 to about 2,000,000, the acrylic modified chlorinated polyolefin polymer being soluble at least 25 weight percent in the organic solvent at processing temperatures;

neutralizing the ionizable groups of the acrylic modified chlorinated polyolefin polymer with an amount of neutralizer effective to form a solution of neutralized polymer;

blending the solution of neutralized polymer with water to form a blend of neutralized polymer, organic solvent, and water; and removing the organic solvent from the blend at a temperature and pressure effective for forming a dispersion of the acrylic modified chlorinated polyolefin polymer having a particle size of not more than 15 microns, the dispersion having less than about 10 weight percent organic solvent, at least about 10 weight percent solids, and a viscosity of less than about 10 poise at ambient temperature, being substantially free of emulsifier, the dispersion effective for providing a coating having an adhesion to polyolefinic substrates of at least about 4B.

22. The method according to claim 21 wherein the dispersion has from about 0.2 to about 3 weight percent organic solvent.

23. The method according to claim 21 wherein the acrylic is a preformed acrylic polymer which includes acrylic monomer and ethylenically unsaturated monomers which are not acrylic monomers.

24. The method according to claim 21 wherein the ionizable group is selected from the group consisting of —COOH, —SO$_3$H, —PO$_4$H$_2$, and mixtures thereof.

25. The method according to claim 24 wherein the ionizable group comprises —COOH.

26. The method according to claim 1 wherein the dispersion has from about 0.2 to about 3 weight percent organic solvent.

27. The method according to claim 1 wherein the acrylic includes acrylic monomers and ethylenically unsaturated monomers which are not acrylic monomers.

28. The method according to claim 11 wherein the acrylic includes acrylic monomers and ethylenically unsaturated monomers which are not acrylic monomers.

29. The method according to claim 21 wherein the acrylic includes acrylic monomers and ethylenically unsaturated monomers which are not acrylic monomers.

* * * * *

UNITED STATES PATENT AND TRADEMARK OFFICE
CERTIFICATE OF CORRECTION

PATENT NO. : 6,225,402 B1
DATED : May 1, 2001
INVENTOR(S) : O'Callaghan et al.

It is certified that error appears in the above-identified patent and that said Letters Patent is hereby corrected as shown below:

Column 10,
Line 54, after "claim" insert -- 1 --.

Signed and Sealed this

Second Day of August, 2005

JON W. DUDAS
*Director of the United States Patent and Trademark Office*